(12) United States Patent
Potts (10) Patent No.: US 6,606,569 B1
(45) Date of Patent: Aug. 12, 2003

(54) METHODS AND SYSTEMS FOR DYNAMIC FORCE MEASUREMENT

(76) Inventor: Gerald R. Potts, 3422 Bancroft Rd., Fairlawn, OH (US) 44333

( * ) Notice: Subject to any disclaimer, the term of this patent is extended or adjusted under 35 U.S.C. 154(b) by 169 days.

(21) Appl. No.: 09/617,447

(22) Filed: Jul. 17, 2000

Related U.S. Application Data (60) Provisional application No. 60/144,104, filed on Jul. 16, 1999.

(51) Int. Cl.[7] ............................................. G06F 19/00
(52) U.S. Cl. ....................................... 702/41; 73/865.9
(58) Field of Search ............................ 702/41; 601/23; 701/38; 73/865.9, 724, 862.59; 188/378

(56) References Cited

U.S. PATENT DOCUMENTS

| | | | |
|---|---|---|---|
| 3,876,192 A | | 4/1975 | Kauer |
| 4,616,352 A | | 10/1986 | Sallas et al. |
| 4,800,748 A | * | 1/1989 | Fischer et al. ............ 73/865.9 |
| 5,421,798 A | * | 6/1995 | Bond et al. .................. 601/23 |
| 6,028,409 A | | 2/2000 | Wierda |
| 6,259,982 B1 | * | 7/2001 | Williams et al. ............. 701/38 |

OTHER PUBLICATIONS

"Dynamic Force Measurement System (DFMS) for Tires"; Gerald R. Potts and Erik F. Knuth; SAE 2001 World Congress; Mar. 5–8, 2001.
"Measurement Systems Application and Design"; Ernest O. Doebelin; Chapter 5, pp. 331–350.

* cited by examiner

*Primary Examiner*—Bryan Bui
*Assistant Examiner*—Xiuquin Sun
(74) *Attorney, Agent, or Firm*—Arter & Hadden LLP (57) ABSTRACT

Dynamic force measurement methods and systems for measuring forces applied to a structure by use of accelerometers attached to masses of the structure supported by one or more load cells. A load cell signal is combined with a summation of the accelerometer readings multiplied by the corresponding attached masses to produce a measurement of a force applied to the structure. An unknown applied force $f(t)$ is determined by summing the load cell measured force with all other forces that exist between the load cell and the unknown force. The methods and systems can be employed in any type of load or force measuring machine or device.

6 Claims, 8 Drawing Sheets

METHODS AND SYSTEMS FOR DYNAMIC FORCE MEASUREMENT

This application claims the benefit of Provisional Application No. 60/144,104, filed Jul. 16, 1999.

FIELD OF THE INVENTION

The present invention pertains generally to highly accurate measurement of forces, and more particularly to measurement of dynamic forces which are transmitted through structural or machine elements.

BACKGROUND OF THE INVENTION

Conventional force sensing technology (CT) pursues the maximization of mechanical resonant frequencies in order to achieve as flat a frequency response for as high a frequency range as possible before the resonant peak produces unacceptable amplification of the forces being input to the measurement system, as sensed and reported by system load cells. Unfortunately, the measurement bandwidth achievable is severely limited with this strategy. Most measurement tranducers are used to only $1/10^{th}$ of their resonant frequencies. Such a practice would, for example, limit High Speed Uniformity (HSU) tire test machines to only about a 20 Hz bandwidth. Most tire test engineers consider measurements to ¾ the resonant frequency of an HSU machine to be useful; however, this does amplify forces measured at such a frequency by a factor of over 2x, which may not be known by the user of the data.

At low excitation frequencies (e.g., less than $1/10^{th}$ the first resonance of the system) both CT and dynamic force measurement (DFM) methods produce similar results. This is generally in the 20 to 50 Hz range. Above that, the two methods produce widely divergent responses to identical inputs. The narrow bandwidth produced by CT methods used to be acceptable; however, today's automotive engineering demands measurement bandwidths that are more than ten times those which conventional technology can produce. Many engineers are now searching for bandwidth improvement, usually through Fast Fourier Transform (FFT) and Frequency Response Function (FRF) measurements, requiring postprocessing of experimental data to compensate for the resonance effects.

SUMMARY OF THE PRESENT INVENTION

Figure 17:
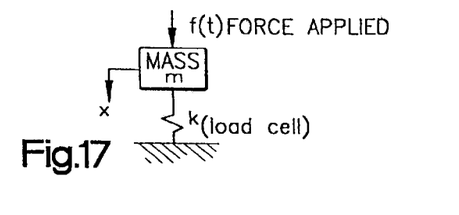
FIG. 17 is a schematic representation of a mass/load cell combination.

Load cells are displacement devices with a stiffness of k force units per unit of displacement so that an equation of motion for the system shown in FIG. 17 is:

$$\sum F = ma \qquad \text{Eq. 1}$$
$$-kx + f(t) = m\ddot{x}$$
$$m\ddot{x} + kx = f(t)$$

Damping is ignored in these equations, but may be added if required as:

$$m\ddot{x} + c\dot{x} + kt = f(t) \qquad \text{Eq. 2}$$

where $m\ddot{x}$ may be estimated by exciting the system with a known transient impulse f(t) and measuring $\ddot{x}$ with an accelerometer, then multiplying it by the mass m. kx is the load cell signal. $c\dot{x}$ may be estimated by integrating the $\ddot{x}$ signal to get $\dot{x}$, then multiplying by the parameter c so that the sum of the three signals add to produce the known input f(t).

This process may be typically simplified by ignoring the damping term $c\dot{x}$ and summing only $m\ddot{x}$ and kx to equal f(t), which works very well. The mass m may be estimated (evaluated) by exciting the system with a transient impulse f(t) and measuring $\ddot{x}$ multiplying by an adjustable constant m, and summing the resulting signal with the load cell signal to null the output during the ring-down period following cessation of application of the transient force f(t).

This general technique is called inertia compensation and has been used in the past to measure applied impact forces during crash tests and other situations that involve accelerated load cells, such as in load cells attached to an automobile wheel that experiences suspension motions during vehicle operation. This technique has not generally been extended to stationary test machines with nominally motionless load cells. Such machines measure input forces through attached masses, as well; however, since the masses are assumed to be motionless (unaccelerated) they are assumed to generate no inertial forces. However, this assumption is not true and the general result of this error is to limit the frequency range of valid measurement by the resonant frequency of the load cell supported mass. As discovered by the inventor and explained herein, the effects of the resonant frequency may be removed from such stationary machines through the above addition of the ineitia force to the load cell force to yield the input force.

The dynamic force measurement methods and systems of the present invention provide the first direct measurement technique capable of the desired bandwidth expansion. Dynamic force measurement devices constructed in accordance with the invention are capable of measuring machine resonant forces which may then be added directly to the load cell forces, thus canceling their effects therein, leaving the test specimen output forces for direct real-time recording during the test, rather than during a post processing session involving Fast Fourier Transform (FFT) and inverse Frequency Response Function (FRF) calculations. Furthermore, the process does not depend upon measurement system linearity. Losses and nonlinear stiffnesses are included in the measurements and fall away in the analysis, thus dispensing with the concerns for both linearity and post processing time and inconvenience.

The invention further provides the ability to select output data as load cell, dynamic force measurement, or both for comparison purposes. This function enables the comparison of data acquired from similar test machines built at different times by different makers, or which may produce different results due to unique resonant frequency signatures of each machine. The methods and apparatus of the invention improve the measurement reproducibility of same-specimen output data on all such machines, making existing test systems upgradable to meet the latest test requirements by allowing wide measurement bandwidth performance. The same high performance test results are also available from newly built low-cost test machines.

These and other aspects of the invention are herein described in particularized detail with reference to the accompanying Figures.

DETAILED DESCRIPTION OF PREFERRED AND ALTERNATE EMBODIMENTS

Figure 1:
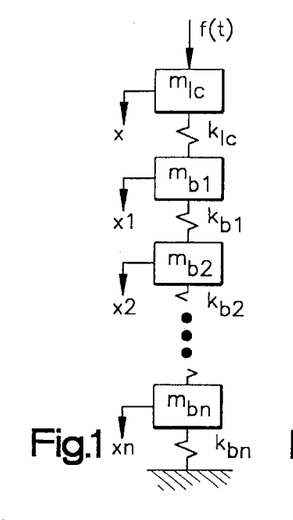
FIG. 1 is a schematic representation of a dynamic load cell supported on a compliant foundation represented by masses and springs.

As shown in FIG. 1, a load cell kx need not be supported by an immovable (infinitely stiff) base, as follows:

$$m_{lc}\ddot{x} + k_{lc}(x - x_1) = f(t) \quad \text{Eq. 3}$$
$$m_{b1}\ddot{x}_1 + k_{b1}(x_1 - x_2) + k_{lc}(x_1 - x) = 0$$
$$\vdots \quad \vdots \quad \vdots$$
$$m_{bn}\ddot{x}_n + k_{bn}(x_n) + k_{lc}(x_n - x_{n-1}) = 0$$

The load cell signal from such a compliant mounting will not be the same as if it were stiffly mounted; however, the f(t) load application will also change correspondingly due to the same cause. The first of the above equations will then still yield the f(t) load applied to the compliant load cell. The first term represents the ma inertia force of the moveable load cell mass and the second is the load cell signal. The remaining equations are not needed to find the applied force f(t).

Figure 2:
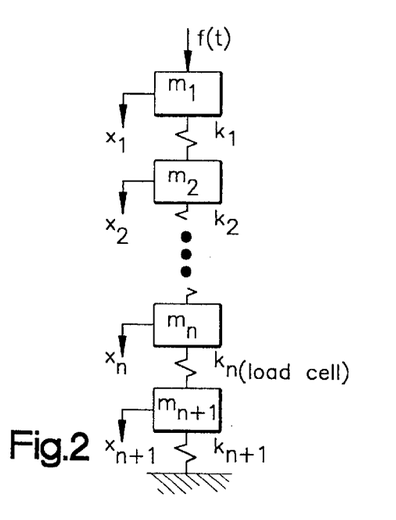
FIG. 2 is a schematic representation of a dynamic load cell supported on a compliant foundation, with a load cell located between an array of masses interconnected by springs.

As shown in FIG. 2, the mass m supported by a load cell lc may be a complex structure composed of several masses mi-mn and springs ki-n. Resonant frequencies contributed by each mass may be removed by addition of its inertia force. However, specimen resonances remain in the resulting signal as long as specimen component ma forces are not added to the load cell measured force.

$$m_1\ddot{x}_1 + k_1(x_1 - x_2) = f(t) \quad \text{Eq. 4}$$
$$m_2\ddot{x}_2 + k_2(x_2 - x_3) + k_1(x_2 - x_1) = 0$$
$$m_3\ddot{x}_3 + k_3(x_3 - x_4) + k_2(x_3 - x_2) = 0$$
$$\vdots \quad \vdots \quad \vdots$$
$$m_n\ddot{x}_n + k_n(x_n - x_{n+1}) + k_{n-1}(x_n - x_{n-1}) = 0$$

This reduces to $$m_1\ddot{x}_1 + m_2\ddot{x}_2 + \ldots + m_n\ddot{x}_n + k_n(x_n - x_{n+1}) = f(t) \quad \text{Eq. 5}$$

where the forces and motions of all support structure masses and springs may be ignored, since their output forces are accounted for in the load cell signal kn(xn−xn.+1), as well as in the sum of ma forces from above the load cell, thus they add-out.

The above process then simplifies to one of realizing that the unknown force f(t) may be measured and equals the sum of all the m$\ddot{x}$ inertia forces for the masses supported by the load cell plus the load cell indicated force. It may be observed that the load cell measures the force in the structure at the location of the load cell. The unknown f(t) may then be found by summing the load cell measured force with all the other forces that exist between the load cell and the unknown force. The same observation is true for moments; the unknown moment m(t) applied to the end mass may be found by summing the load cell measured moment with all the other moments that exist between the load cell and the unknown moment. This includes the m$\ddot{x}$ inertia forces times their moment arms.

If the structure supported by the load cell is continuous, rather than consisting of lumped masses and springs, it may be broken into a series of finite masses times the accelerations of the centers of gravity of those masses measured in order to develop f(t) and m(t) through a frequency range represented by the highest resonant frequency (and mode shape) of the n lumped masses. The higher the frequency range desired, the more discrete masses must be used to represent the continuous structure.

Figures 3, 4:
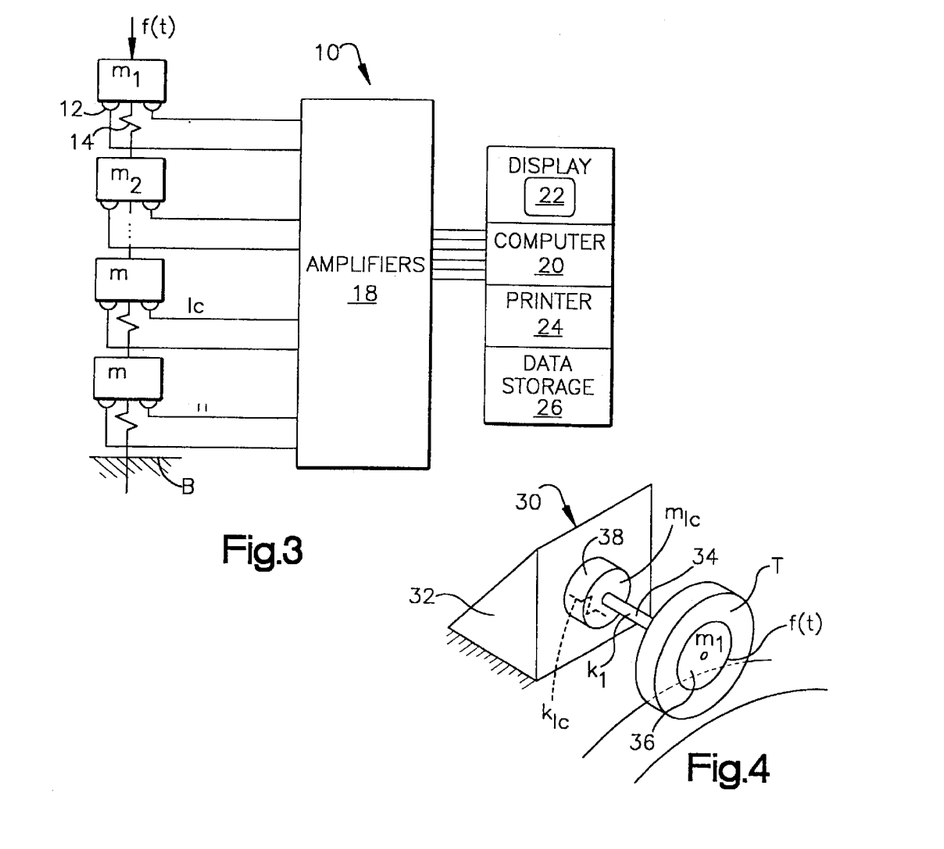
FIG. 3 is a schematic drawing of a dynamic force measurement system of the present invention.
FIG. 4 is a schematic drawing of a tire force measuring machine constructed in accordance with the methods and systems of the present invention.

FIG. 3 schematically represents a device 10 which performs the described dynamic force measurement. The device 10 includes masses m, each with attached multiaxis accelerometers 12, and interconnected by springs k and a load cell lc to a base B. The output of the accelerometers is amplified through amplifier(s) 18, and input to a computer system including a computer 20 with associated display 22, printer 24 and data storage 26. The computer 20 performs data acquisition and algorithmic operation of Eq. 5.

The principles of the invention are, in one particular embodiment, applicable to tire testing or tire uniformity machines used to determine if a tire has uniform construction or mass distribution, and to correct non-uniformities based upon force measurements. Tire testing machines are made to operate a tire under load against either a round roadwheel or a flat belt surface with a smooth or roughly textured surface which simulates a road. A load cell is typically located between the tire spindle (axle) and the test machine support frame. As shown in FIG. 4, a tire test machine, indicated generally at 30 includes a frame 32 in which is mounted a rotational driving mechanism for rotating a spindle 34 on which a wheel 36 is mounted, on which a tire T is mounted. The wheel 36 is also labelled as m1, and a load cell 38 as mic.

It is desired to know the dynamic force history f(t) that is being output by the tire to the wheel that the tire is mounted upon. Accelerometers mounted on mi and mic will measure the necessary accelerations of the main masses in the above system and allow a calculation of f(t) when combined with the load cell signal in Equation 5 as:

$$m_1\ddot{x}_1 + m_{1c}\ddot{x}_{1c} + (\text{load cell signal}) = f(t) \qquad \text{Eq. 6}$$

Figure 5:
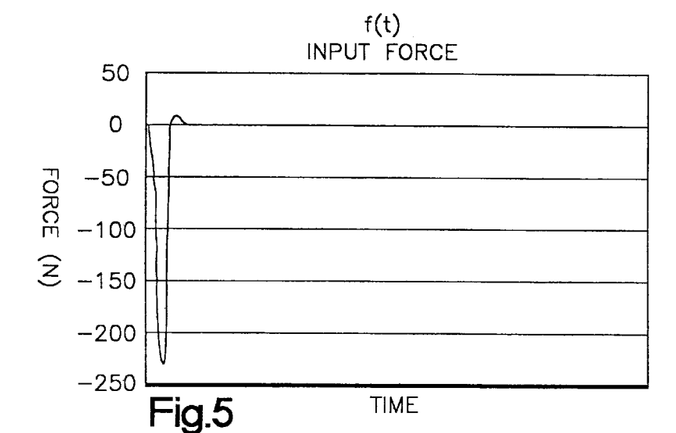
FIG. 5 is a plot of a measured input force f(t) versus time.
Figure 6:
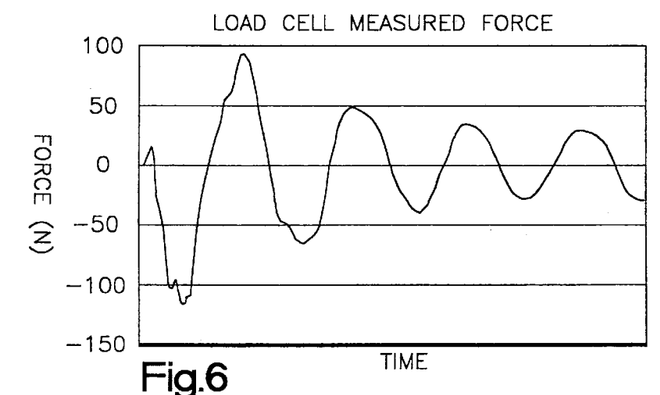
FIG. 6 is a plot of a load cell measured force without the use of the dynamic force measurement system of the present invention.
Figure 7:
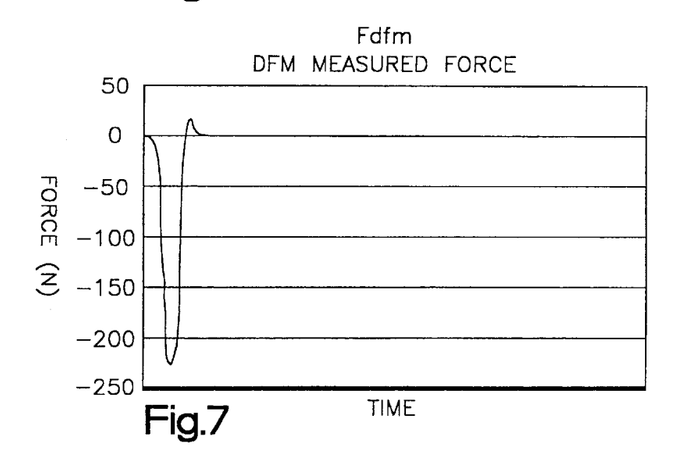
FIG. 7 is a plot of dynamic measured force versus time using the present invention.
Figure 8:
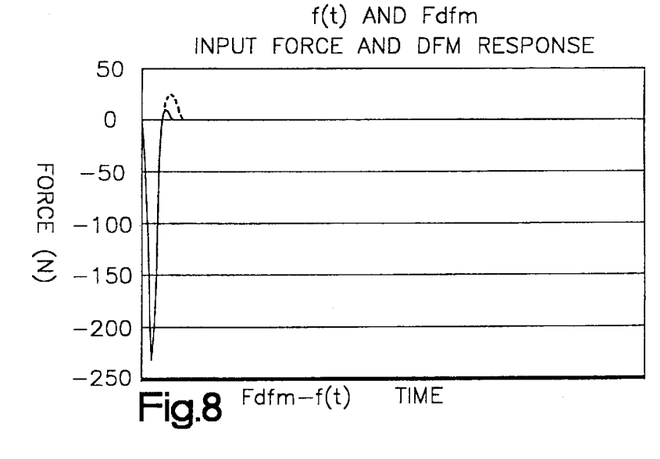
FIG. 8 is a plot of input force f(t) and dynamic force measurement response versus time (as shown in FIGS. 5 and 7) plotted on the same graph for direct comparison.

Calibration of the above system may be accomplished by applying a known impulsive force f(t) to the hub of wheel mass mi, then adjusting the values of mi and mic in Eq. 6 to generate the best agreement between f(t), as calculated by Eq. 6 and measured by the input forcing device (e.g., an instrumented hammer) that generated the input f(t). This process is shown in FIGS. 5–8. FIG. 5 is a plot of a hammer input force versus time. FIG. 6 is a plot of a load cell measured force versus time. It can be seen that even though the hammer applied force in FIG. 5 returns to zero upon the retraction of the hammer from the hub, the load cell continues to output an oscillatory (ringing) force, as shown in FIG. 6. This ringing is the load cell reaction force of the sum of all the m$\ddot{x}$ forces being applied to the load cell and is equal in magnitude full opposite in direction to the measured and calculated m$\ddot{x}$ quantities, thus their addition to the load cell force in FIG. 6 produces the plot shown in FIG. 7. FIG. 7 is a plot of the dynamic measured force versus time, as calculated from Eq. 6. And FIG. 8 is a plot of the input force and dynamic measured force versus time.

Figure 9:
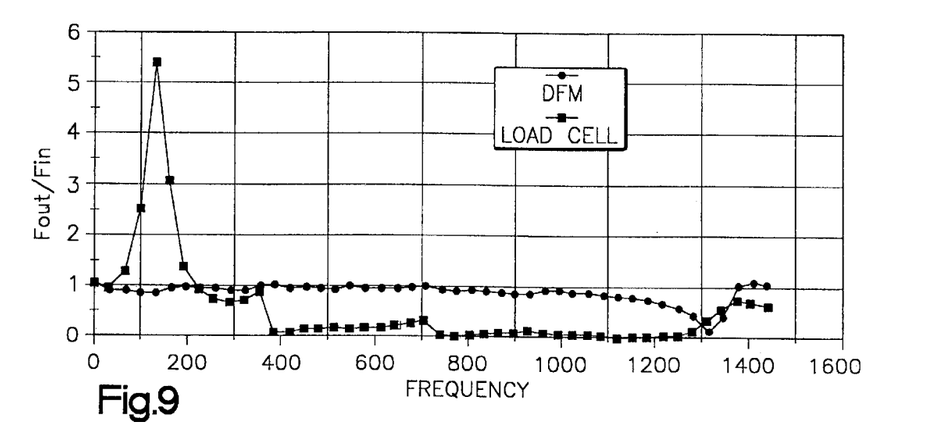
FIG. 9 is a magnitude plot of Frequency Response Functions of the tire force measuring machine of FIG. 4 showing both load cell results (no DFM) and the result after application of the present invention (DFM)
Figure 10:
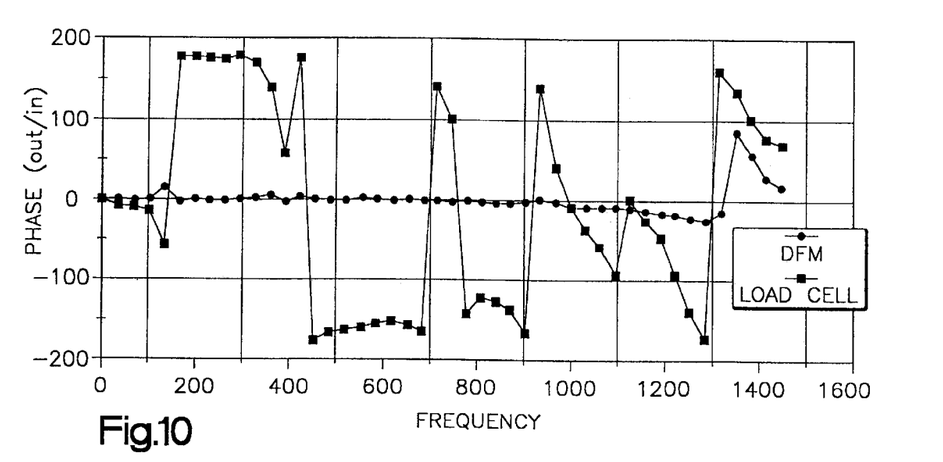
FIG. 10 is a phase plot of Frequency Response Functions of the tire force measuring machine of FIG. 4 showing both load cell results (no DFM) and the result after application of the present invention (DFM)

FIGS. 9 and 10 are plots of frequency response functions of dynamic force measurements and load cell measurements.

Figure 11A:
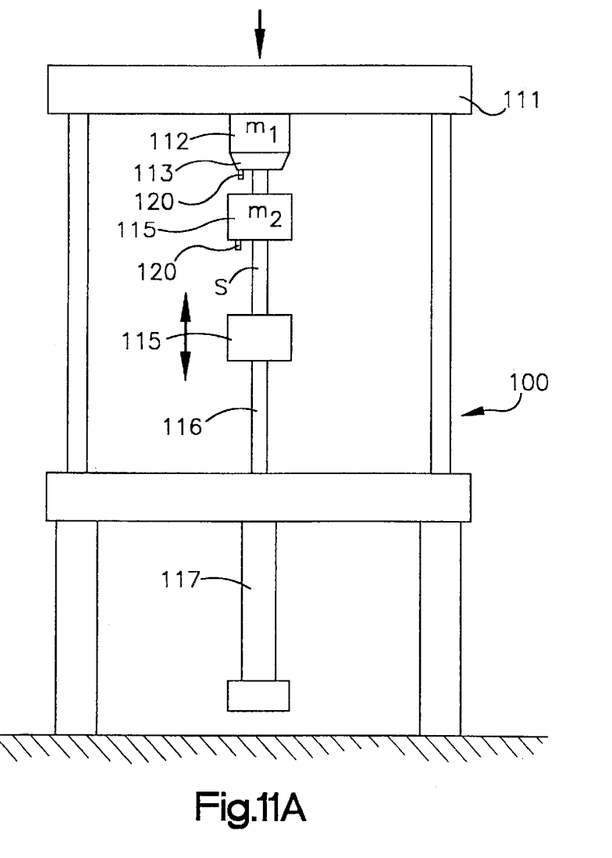
FIGS. 11A and 11B are schematic representations of a universal force testing machine.

FIG. 11A schematically illustrates a universal force testing machine constructed in accordance with the invention, which has a universal load frame 100 with an upper member 111 which supports a load cell 112. Attached to the load cell 112 is an interface connector 113, and tipper and lower hydraulic clamps 115 between which a test specimen S is positioned. An actuator rod 116, which extends from a hydraulic actuator 117, is attached to the lower hydraulic clamp 115 to apply linear forces to the test specimen S. Accelerometers 120 are attached to either the free end of the load cell 112, or to the interface connector 113 attached to the load cell, and to the upper hydraulic clamp 115.

Figure 11B:
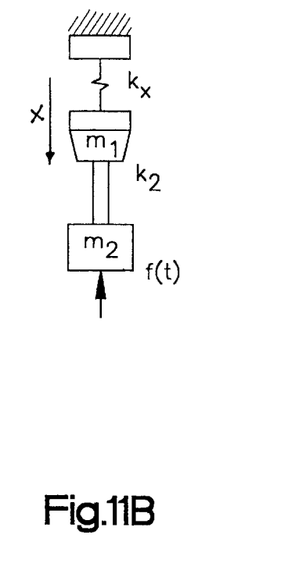

As schematically shown in FIG. 11B, this arrangement allows measurement of the accelerated masses (i.e., of the upper hydraulic clamp and the load cell), plus the load cell signal $k_X$ to determine an unknown applied force f(t).

$$m_1\ddot{x}_k + m_2\ddot{x}_{2k} + kxX = f(t) \qquad \text{Eq. 7}$$

Figure 12A:
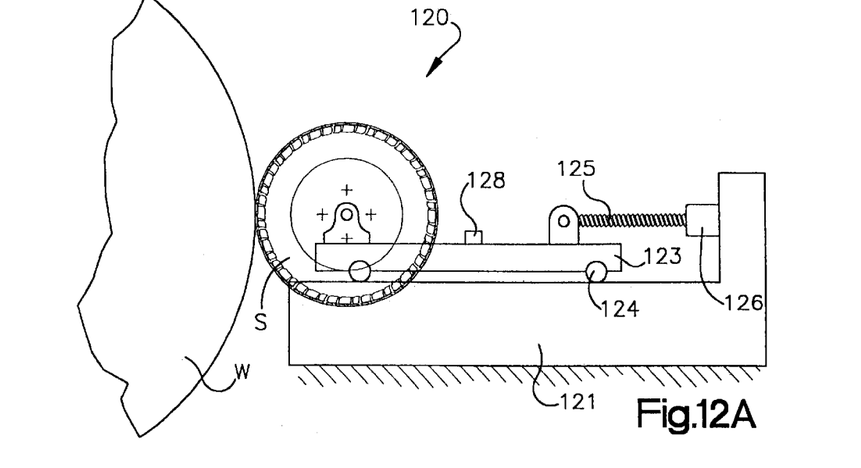
FIGS. 12A, 12B and 12C are schematic representations of a tire rolling resistance and endurance test machine.
Figure 12B:
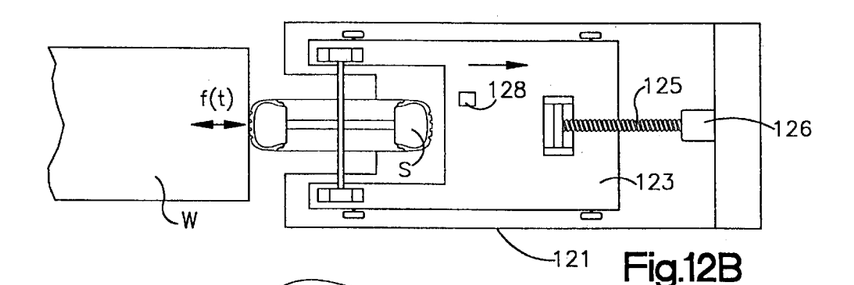

FIGS. 12A and 12B schematically illustrate a tire rolling resistance and endurance test machine, indicated generally at 120, having a frame 121 on which a load carriage 123 is placed on wheels 124. The load carriage 123 is connected by a jack screw load actuator 125 to a load cell 126 which is attached to the frame 121. A tire or test specimen S is rotationally mounted upon the load carriage 123 to roll against a road wheel W. An accelerometer 128 is also attached to the load carriage 123. The inertia force of the combined mass of the load carriage 123 (including the test specimen 5) is added to the load cell signal to determine the force applied by the tire spindle to the load carriage mass, f(t). Tire force variations f(t) may thus be determined during rolling resistance or endurance testing.

Figure 12C:
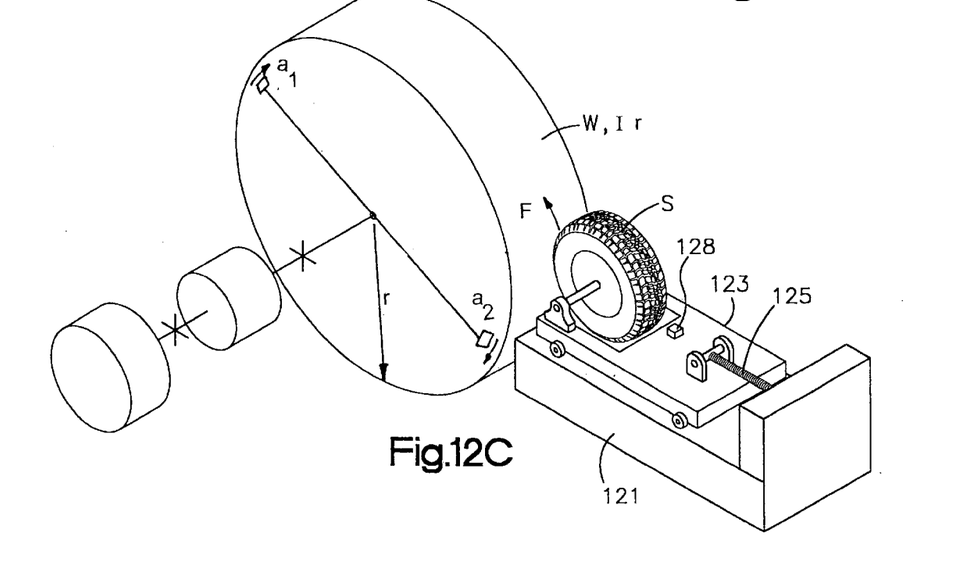

FIG. 12C shows a further rolling resistance application in which, at steady state speed, the roadwheel driving torque just equals the tire and bearing rolling losses. Unfortunately, such a steady state speed is almost impossible to achieve with today's closed-loop speed controls, which hunt and oscillate on either side of the target speed. Averaging of the torque cell measurements over a period of several minutes generally stabilizes the results; however, if a short term or instant rolling resistance reading is desired, the angular acceleration x of the roadwheel and test tire/wheel generates a substantial inertia torque Lx that is included in the torque cell reading, thus confounding its measurement of tire and bearing rolling loss, such as $$T = \text{Torque cell} = kx + Fr$$

At steady speed the x terms=0. Over time, the positive and negative x values average to zero. If an instant evaluation of Fr is desired, α must be either measured using accelerometers or by calculation using speed measurements over a short time interval.

Then a measure of the rolling resistance force F is given by $$F = \frac{T - I\alpha}{r} \qquad \text{Eq. 8a}$$

α may be determined by measurement of the circumferential acceleration at accelerometers a, and a2, located at radii $r_1$. Two accelerometers keep the roadwheel balanced and cancel gravitational effects. Then $$\alpha = \frac{a_1 + a_2}{2rI} \qquad \text{Eq. 8b}$$

using positive acceleration directions as shown in FIG. 12 C.

Figure 13A:
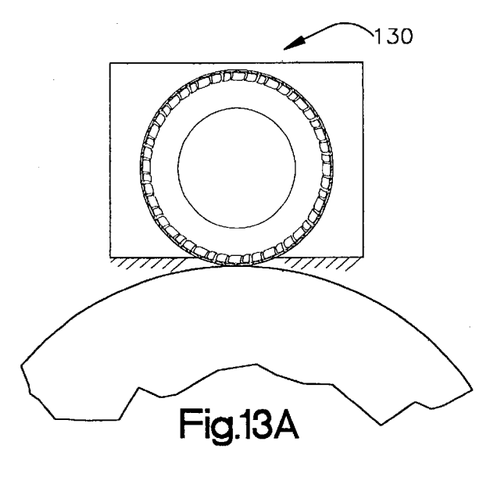
FIGS. 13A, 13B and 13C are schematic representations of another type of tire force testing.
Figure 13B:
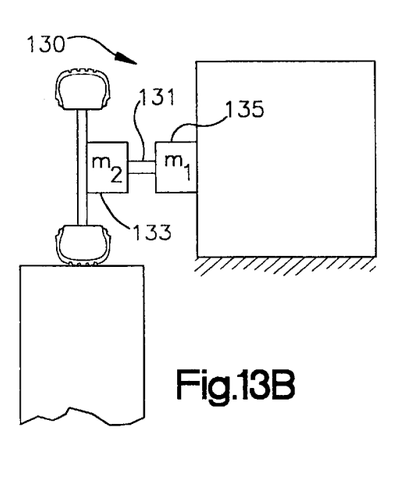
Figure 13C:
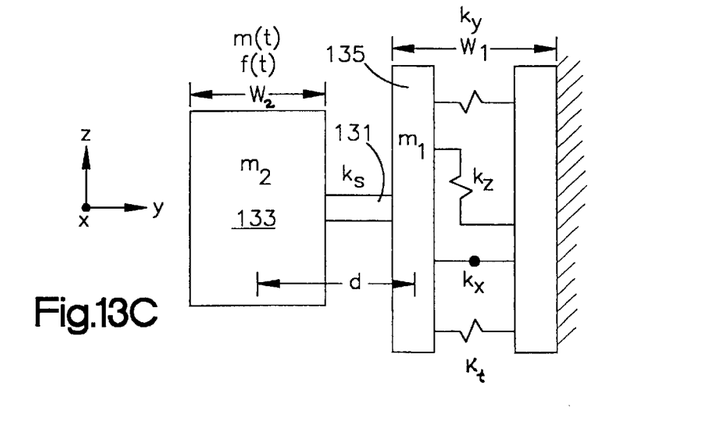

FIGS. 13A and 13B and 13C schematically illustrate another type of tire test stand, indicated generally at 130, in which test tire specimen S is shown in cross-section and is rotationally driven by a drive shaft 131. A load cell 135 is located at the driving interface of drive shaft 131.

The following equations add the accelerations of the discrete masses to the load cell signals to determine unknown forces and moments in a system with multiple axes and masses.

Equations of motion $$m_1 a_{1x} + m_2 a_{2x} + k_x x = f_x(t)$$

$$m_1 a_{1y} + m_2 a_{2y} + k_y y = f_y(t)$$

$$m_1 a_{1z} + m_2 a_{2z} + k_z z = f_z(t)$$

$$I_{1x} d_{x1} + I_{2x} d_{x2} \_k_{tx} O_x = mx(t)$$

$$m_2 a_{2z} \frac{w_2}{2} + m_1 a_{1z}\left(d + \frac{w_2}{2}\right) + k_z z\left(\frac{w_1}{2} + d + \frac{w_2}{2}\right)$$

$$\underbrace{\begin{aligned} I_{1z} d_{1z} + I_{2z} d_{2z} + \\ m_1 a_{1x}\left(\frac{w_2}{2} + d\right) + m_2 a_{2x} \\ ma, Id \\ measurements. \end{aligned}}_{} \quad \underbrace{\begin{aligned} \left(\frac{w_2}{2}\right) + k_x z\left(\frac{w_1 + w_2}{2} + d\right) + \\ \frac{k_t z O_z}{\text{Load cell}} = \frac{m_z(t)}{\uparrow} \\ \text{signals} \quad \begin{aligned} \text{unknown} \\ \text{forces \&} \\ \text{moments} \end{aligned} \end{aligned}}_{}$$

Figure 14A:
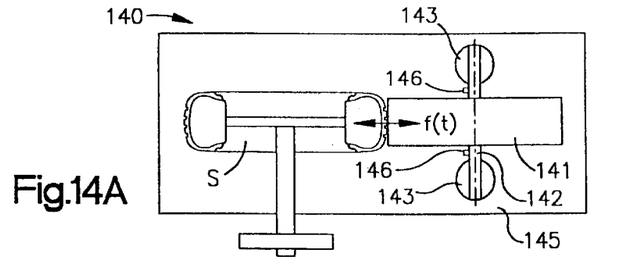
FIGS. 14A and 14B are schematic representations of another type of tire force testing.
Figure 14B:
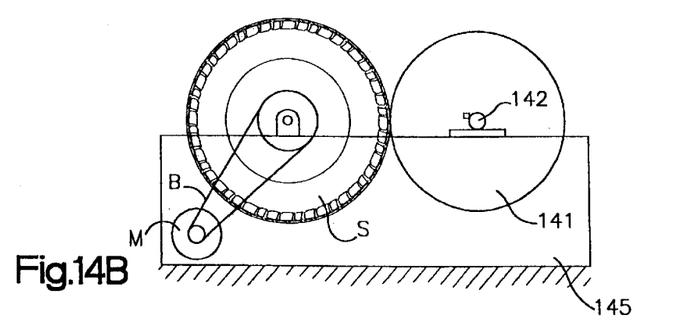

FIGS. 14A and 14B schematically illustrate another type of tire uniformity testing machine, indicated generally at 140, in a tire specimen S is rotationally driven by a drive motor M and belt B, against a load wheel 141. The load wheel 141 is mounted upon an axle or spindle 142 which is supported by multiple axis load cells 143 on the machine frame 145. Accelerometers 146 are attached to the spindle 142 as close as possible to mass of the load wheel, 142. Because the mass of the load wheel and spindle is supported by load cells, and acceleration of the load wheel mass is measured by the accelerometers, the unknown force f(t) between the load wheel 141 and the specimen S can be determined in three axis as follows:

$$m\ddot{x}+Kx=fx(t)$$

$$m\ddot{y}+Ky=fy(t)$$

$$m\ddot{z}+kz=fz(t)$$

The invention further includes load measuring devices and methods for measuring rapidly changing loads or forces. Standard load cells rely upon the deflection of an elastic element to generate an electric signal that is proportional to the deflection of the elastic element. A dynamic load cell (DLC) of the invention includes both the elastic element and an acceleration measuring element (i.e., accelerometer) attached to a load attachment pad of the load cell. Signal conditioning electronics are calibrated to properly scale a multiplier of acceleration to arrive at the ma (m$\ddot{x}$) product of the attached mass times the measure acceleration of the load attachment pad, to be summed with the elastic deflection signal as:

$$f(t)=kx+mx \qquad \text{Eq. 9}$$

where f(t) is the unknown time-varying force f(t) (i.e. dynamic force), k is the stiffness of the load cell elastic element, x is the deflection of the load cell elastic elements, m is the attached mass, and x. is the acceleration of the attached mass. Whereas prior art analysis has cited on the kx portion of the equation a the load cell contribution to dynamic force measurement, this embodiment includes both the kx and mx. contributions as:

$$f(t)=mx+kx \qquad \text{Eq. 10}$$

Figure 15:
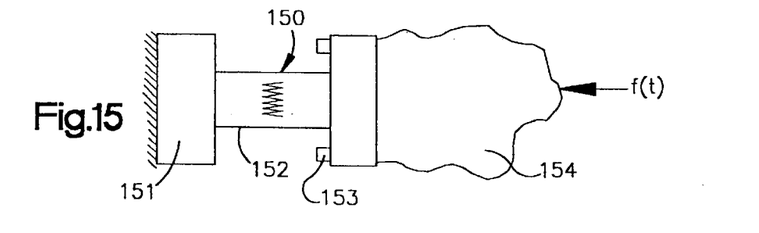
FIG. 15 is a schematic representation of a load cell/accelerometer/attached mass combination showing the load cell as an elastic member.

This approach is further illustrated in FIG. 15 wherein a load cell 150 includes a base 151, and elastic member 152 with an attached displacement transducer, and an attached mass 154 with accelerometer 153, to which the force f(t) is applied. This load cell may be both statically and dynamically calibrated by applying dead-weight loads and impact hammer forces respectively. Dead weights provide a basic calibration load which may then be directly related to the electrically generated displacement transducer voltage as either a volts/force unit or force units/volt calibration factor for the zero Hz frequency of f(t).

Figure 16A:
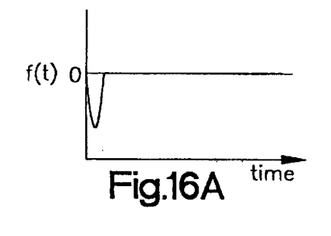
FIGS. 16A–16C are plots of an input force f(t) to the attached mass of FIG. 15 over time.
Figure 16B:
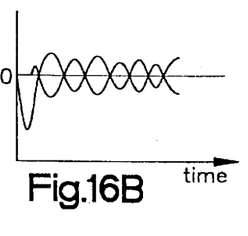
Figure 16C:
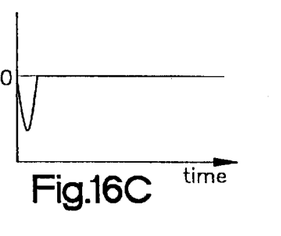

Striking the attached mass with an instrumented hammer will produce the signals shown in FIGS. 16A–16C. The accelerometer-times-mass signal may be varied by adjusting the multiplier (gain) of the accelerometer amplifier until its oscillation just cancels the complimentary displacement transducer oscillations after the hammer force been delivered to the attached mass. If no mass has been attached to the load cell (mass of zero value) the same procedure is followed for the dynamic calibration. The internal mass of the load application platform of the load cell is then the mass in that case.

Multi-axis load cells may be built in a similar fashion so that at least one accelerometer is used to measure the load cell attached mass in each load cell measurement axis direction to combine with the elastic member signal in completing the force measurement.

Moment (torque) inputs are measured as follows.

$$T(t)=I\int|\$]\$\ddot{}g\ddot{v}+k\theta \qquad \text{Eq. 11}$$

Where I is the rotary moment of inertia of attached mass, θ is a the angular acceleration of the attached mass, k is the torsional stiffness of the load cell elastic element, and o is the torsional or angular deflection.

As shown in FIG. 15, the difference between the signals of accelerometers 153 and 155 is divided by the separating distance d to yield the o for use in the moment Eq. 11.

Figure 18A:
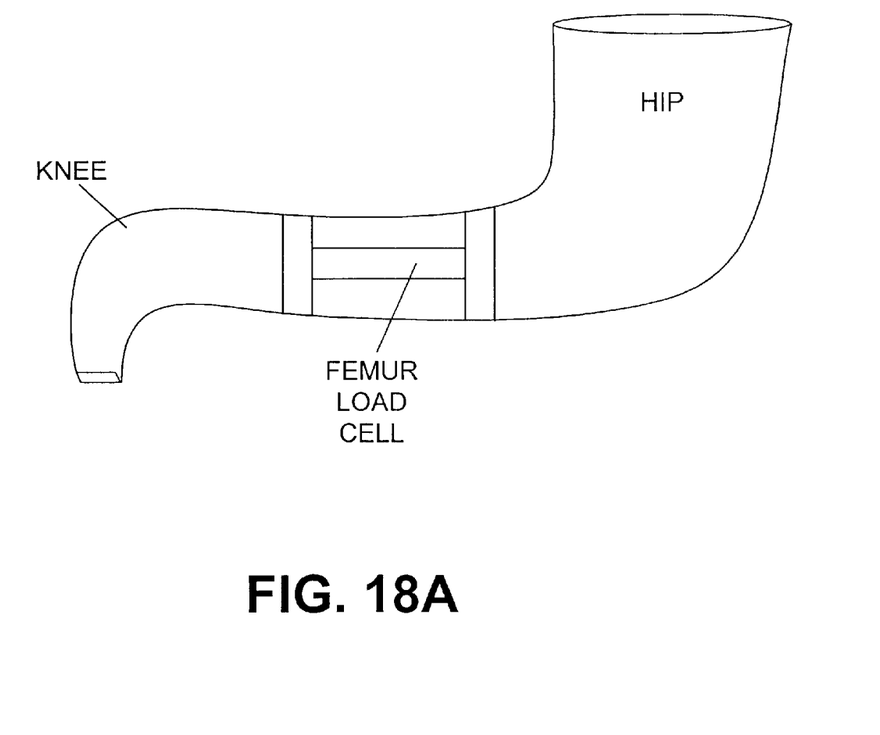
FIG. 18A and 18B are alternative applications of the invention.
Figure 18B:
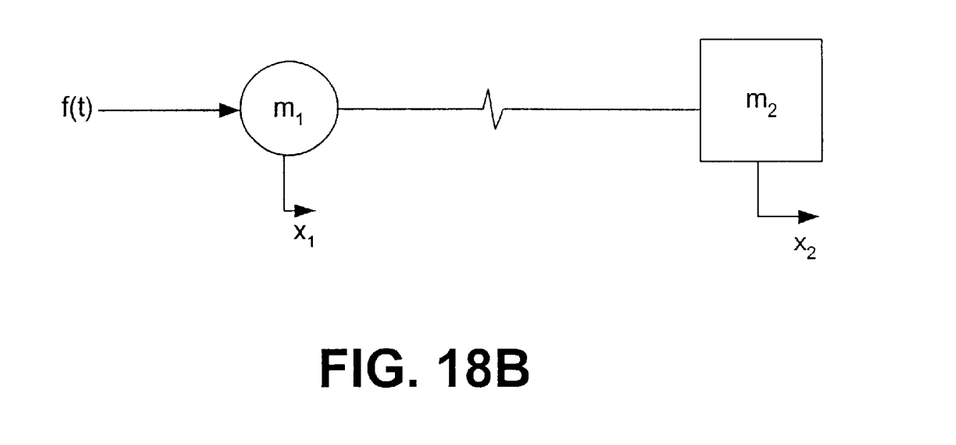

FIGS. 18A and 18B shematically illustrate a crash test dummy with a femur load cell and unkown force f(t) applied to the knee. F(t) may be determined from $$f(t)=m_1\ddot{x}_1+k(x_1-x_2)$$

Thus summation of the accelermeter product m, x, with the load all femur signal k ($x_1-x_2$) yields the unknown applied force f(t). This approach also cancels the resonance created by masses attached to the femur load cell stiffness.

The invention claimed is:

1. A method of determining an unknown force f(t) in a nominally stationary machine having masses which are substantially rigidly connected and to which is applied an input force f(t) to a mass $m_i$ supported by a load cell and wherein the masses of the machine when accelerated generate inertial forces, the method comprising the steps of:

attaching means for measuring acceleration of masses $m_i$–$m_{1c}$ located between an input force f(t) and a load cell;

summing the measured acceleration of each mass times that mass (m$\ddot{x}$) located between the input force f(t) and the load cell plus the load cell indicated force to determine the unknown input force f(t).

2. The method of claim 1 wherein the step of attaching means for measuring acceleration of masses includes attaching accelerometers to one or more masses located between a point of application of the input force f(t) and the load cell.

3. The method of claim 1 wherein the step of summing the measured acceleration of masses times each mass between the applied input force f(t) and the load cell with the load cell force is performed by amplifying the output of accelerometers associated with each mass and amplifying a load cell signal and inputting amplified signals to a computer system adapted to produce a value indicative of the unknown force f(t).

4. A device for determining an unknown applied force f(t) in a machine which applies an input force f(t) to a mass $m_1$ supported by a load cell and additional masses $m_1$–$m_2$ between the load cell and the applied force f(t), the device comprising:

a plurality of multi-axis accelerometers adapted for attachment to masses $m_1$ and $m_2$ through $m_{1c}$, each of the accelerometers electrically connected to one or more amplifiers and output to a computer system configured to calculate the inertia forces and moments of each mass by multiplying either the measured linear or angular acceleration of each mass, as detected by the accelerometers, by the respective mass or moment of inertia values; and summing these forces and moments; and adding a load cell signal to produce a value for the unknown force f(t).

5. A device for determining an unknown force f(t) applied by a machine to a mass $m_1$ supported by a load cell and additional masses $m_2$–$m_{1c}$ between the load cell and the applied force f(t), the device comprising:

a plurality of multi-axis accelerometers adapted for attachment to masses $m_1$–$m_{1c}$ each of the accelerometers electrically connected to one or more amplifiers and output to a computer system configured to sum the products of acceleration or angular acceleration of each mass multiplied by the corresponding mass or mass moment of inertia values, respectively;

means for detecting a load cell signal and inputting a detected load cell signal to the computer system, the computer system further configured to sum the mass times acceleration products, or moment of inertia times angular acceleration products, with the load cell signal to produce a value for the unknown force f(t).

6. In a high speed tire testing machine an instrumentation system for determining tire-generated unknown non-uniformity forces f(t), the system comprising:

means for measuring acceleration of the ideally rigid masses supported by a load cell;

means for measuring a load cell indicated force;

means for summing the products of the masses and respective accelerations and the load cell force to provide an f(t) value.

* * * * *